Figure 1B:
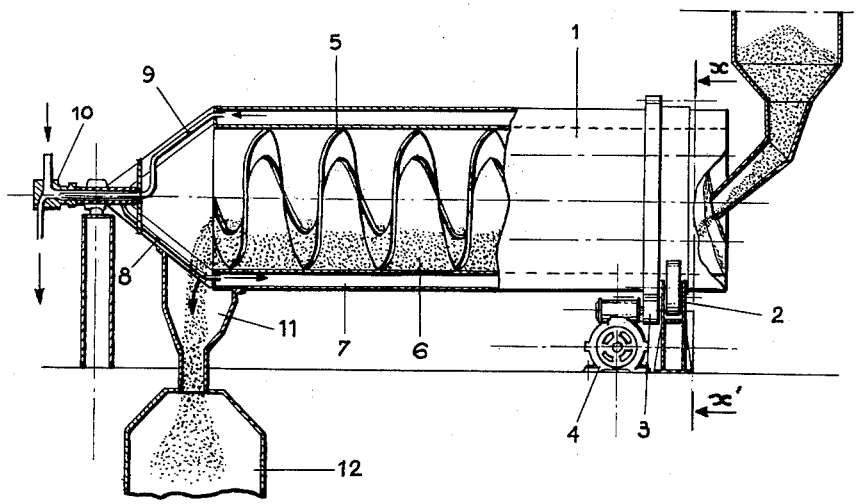
Figure 1B:
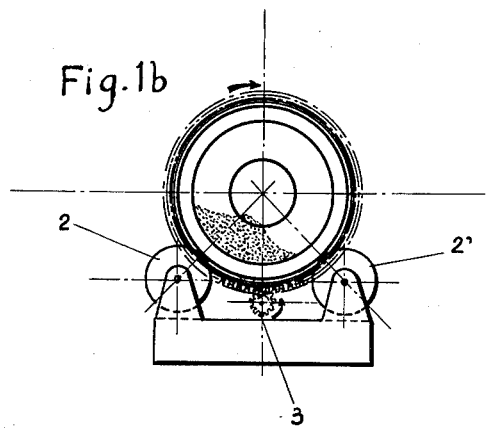

Jan. 2, 1962 C. VEYRIE 3,015,219
APPARATUS FOR COOLING GRANULAR MATERIAL
Filed July 22, 1959 3 Sheets-Sheet 1

Fig : 1a

INVENTOR

CHARLES VEYRIE

BY

Paul M. Craig, Jr.
ATTORNEY

Jan. 2, 1962 C. VEYRIE 3,015,219
APPARATUS FOR COOLING GRANULAR MATERIAL
Filed July 22, 1959 3 Sheets-Sheet 3
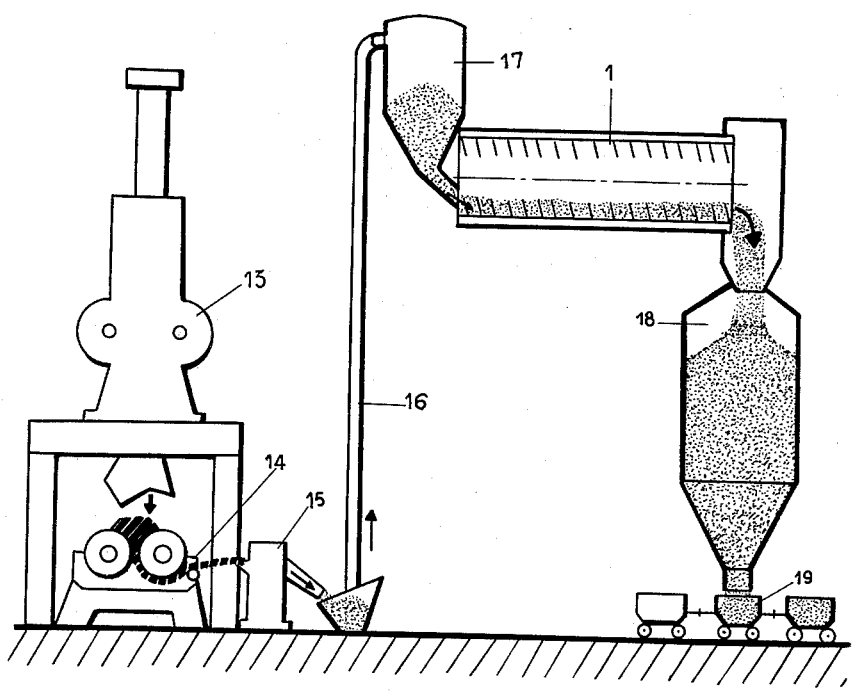
fig :3
INVENTOR
CHARLES VEYRIE
BY
Paul M. Craig, Jr.
ATTORNEY United States Patent Office 3,015,219
Patented Jan. 2, 1962

3,015,219
APPARATUS FOR COOLING GRANULAR MATERIAL
Charles Veyrie, La Garenne-Colombes, France, assignor to Compagnie Generale d'Electricite, Paris, France, a French corporation
Filed July 22, 1959, Ser. No. 828,782
Claims priority, application France July 22, 1958
2 Claims. (Cl. 62—381)

The present invention relates to apparatus for cooling granular material and is applicable to industrial installations in which a granular starting material such as rubber is worked by means of machines such as extrusion presses.

It is known, in such installations, to feed the starting material to the said machines in the form of granules cut from a ribbon of rolled rubber. This arrangement, while having a number of advantages, has the disadvantages that the granules are likely to agglomerate together in the receptacles in which they are stored, by reason of the adhesive properties of rubber. This danger exists above all when the ambient temperature is relatively high, i.e. the order of 25° C. or more.

In order to obviate this disadvantage, it has been proposed to cool the ribbon of rubber from which the granules will subsequently be cut. This cooling may be effected by passing the ribbon through water, but the ribbon then carries with it a quantity of water, which is retained on the granules obtained and causes defects in the products delivered from the extrusion press. In addition, when it is desired to use granules for large-scale continuous production, the ribbon can be left in the water only for a limited time, so that they are not cooled throughout their mass, and their surface temperature rises after they leave the water. Finally it is difficult to render automatic the operations of immersion in the water and introduction into the so-called "granulating machine," which cuts the ribbon into granules.

It has also been proposed to cool the ribbon by passing it over the surface of a rotating cylinder, within which a water circulation is maintained. The rubber is then no longer in direct contact with the water, and therefore can no longer carry water with it to the extrusion press. However, the other aforesaid disadvantages, namely insufficient cooling and difficulty in rendering the operation automatic still remain.

It has further been proposed to coil the ribbon on a plate after it has been coated with talc and to allow it to cool naturally in the ambient air, but this process necessitates a very long cooling period, amounting to many hours. In addition, the cooling is not sufficiently effective if the ambient temperature is high. For example, in hot weather, the granules obtained from ribbons cooled by this method continue to stick together. On the other hand, the said process involves the storage of a considerable quantity of ribbons, which requires considerable space. In addition, during cooling, the ribbons are likely to be polluted by impurities which may be present in the place of storage. Finally, this method obviously does not lend itself to continuous automatic working.

The present invention has for its object to provide apparatus which is not subject to these various disadvantages.

Accordingly the invention provides apparatus for cooling granular material cut from a hot-rolled ribbon of rubber or the like, wherein the granules are directly cooled immediately after they are cut from the ribbon.

The invention further provides a cooling apparatus comprising a rotatable cylinder mounted with its axis substantially horizontal and having internal helical conveyor blades and an external jacket enclosing a space around the cylinder through which a cooling fluid can be circulated, the arrangement being such that the granules can be caused to travel through the said cylinder between the said blades under the combined action of the granular weight and of the rotation of the cylinder.

Figure 2:
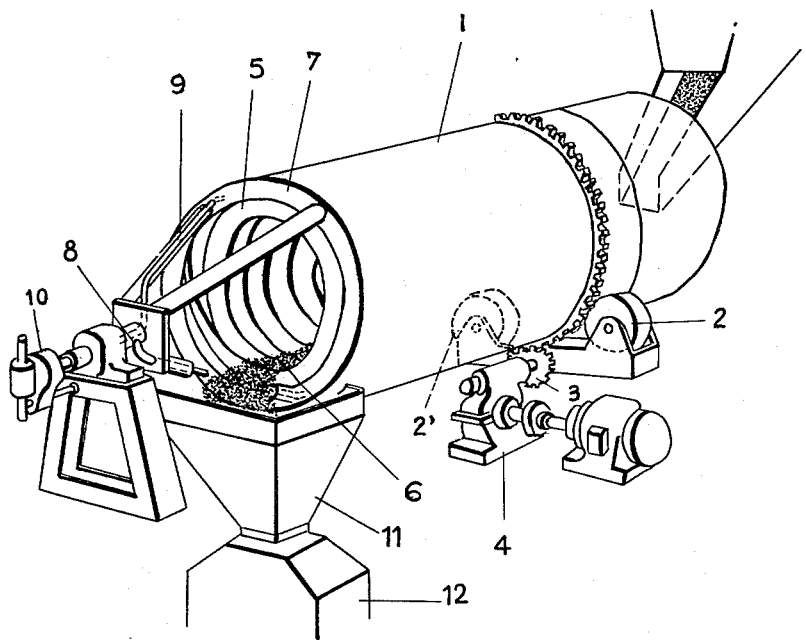

One embodiment of the apparatus of the invention, is illustrated in the accompanying drawings, in which, FIG. 1a is a partial sectional longitudinal view of an apparatus of the invention, FIG. 1b is an axial section on the line X—X' of FIG. 1a, FIG. 2 is a perspective view of the apparatus of FIGS. 1a and 1b, and FIG. 3 illustrates an installation comprising the apparatus of FIGS. 1a, 1b and 2.

In the drawings, 1 designates the body of a double-walled cylinder, which rests on rollers 2, 2' and is rotated by means of peripheral teeth meshing with a pinion 3 driven by a driving and reduction unit 4. Disposed within the interior of the cylinder 1 are helical blades 5, which drive a mass of granules 6 between them. The outer wall of cylinder 1 serves as a jacket enclosing a space 7 of annular cross-section, in which a water circulation is maintained by means of pipes 8, 9. The said pipes are connected to a connecting box 10 disposed co-axially with the cylinder 1, so that they can be fed with water despite the rotation of the cylinder, the cooled granules fall into a funnel 11, which delivers them into a receptacle 12.

The granules are introduced at one end of the cylinder and, under the combined effect of the rotation of the cylinder and of their own weight, they undergo a movement through the gaps between the blades, and are thus subjected both to a translational movement and to rotational movement, in the course of which they come into contact with the walls of the water jacket of the cylinder, and are therefore vigorously cooled throughout their mass, until their temperature is in the neighbourhood of that of the cooling water.

The duration of this treatment, which is adjusted in accordance with the final temperature which it is desired to obtain, is a function of the length of the cylinder and of its speed of rotation.

The high value of the thermal resistivity of the rubber, which is troublesome in the application of the known cooling methods, constitutes an advantage in carrying out the invention, because the granules stored in the containers retain their low temperature for a long time, whereby the dangers of sticking and setting are eliminated.

The installation shown in FIGURE 3 comprises an automatic mixer 13, in which is effected the mixing of the various ingredients constituting the starting material for the granules, a device 14 comprising cylinders, which collects the hot starting material leaving the mixer in bulk and delivers it in the form of a ribbon, a granulator 15 which cuts the said ribbon into granules, and a pneumatic conveyor device 16 which feeds the granules, after they have passed through a cyclone air separator 17, to the inlet of the cooling cylinder 1 previously described. On leaving the latter, the cooled granules are collected in a hopper 18, from which they are discharged into trucks 19 or other transport means, which carry them towards the extrusion presses.

What I claim is:

1. Apparatus for cooling particulate material comprising a rotatable double-walled cylinder having its axis mounted substantially horizontally, means for rotating said cylinder about its axis, the inner wall of said double-walled cylinder defining a chamber through which the material passes, helical conveyor blades within said chamber, means for feeding material to one end of said chamber, said means including a pneumatic conveyor device in which said material is partially cooled and an air separating means, means at the other end of said chamber for the withdrawal of the cooled material, the inner and outer walls of said double-walled cylinder defining therebetween an annular cooling chamber, and means for circulating a cooling medium into and out of said cooling chamber, said last-mentioned means including pipe means mounted to rotate with said double-walled cylinder, and a stationary connecting box in communication with said pipe means.

2. An apparatus according to claim 1, wherein said means for rotating said double-walled cylinder include peripheral teeth on the outer wall of said cylinder and pinion means associated with said teeth.

References Cited in the file of this patent
UNITED STATES PATENTS

| | | |
|---|---|---|
| 2,478,889 | Harris | Aug. 16, 1949 |
| 2,665,568 | Meyer et al. | Jan. 12, 1954 |